(12) United States Patent
Miranda et al.

(10) Patent No.: US 6,441,974 B1
(45) Date of Patent: Aug. 27, 2002

(54) SHOPPING CART MAGNIFIER (E-Z READER)

(76) Inventors: Thomas A. Miranda, 351 Pleasant St., Northampton, MA (US) 01060; Jonathan C. Roche, P.O. Box 218, Ashfield, MA (US) 01330; Randolph G. Duso, 14 Briggs St., Easthampton, MA (US) 01027

( * ) Notice: Subject to any disclaimer, the term of this patent is extended or adjusted under 35 U.S.C. 154(b) by 53 days.

(21) Appl. No.: 09/727,894

(22) Filed: Dec. 1, 2000

Related U.S. Application Data

(60) Provisional application No. 60/168,645, filed on Dec. 3, 1999.

(51) Int. Cl.[7] ................................................. G02B 7/02
(52) U.S. Cl. .................... 359/811; 359/809; 359/818; 359/802
(58) Field of Search .............................. 359/802, 803, 359/809, 811, 818, 819, 822, 436, 440

(56) References Cited

U.S. PATENT DOCUMENTS

| | | | | |
|---|---|---|---|---|
| 2,795,997 A | * | 6/1957 | Allen | 359/802 |
| 3,955,884 A | * | 5/1976 | Del Oesco, Sr. | 359/818 |
| 5,113,289 A | | 5/1992 | Soper | |
| 5,245,477 A | | 9/1993 | Nyman | |
| 5,467,229 A | * | 11/1995 | Rumsey et al. | 359/818 |
| 5,847,883 A | * | 12/1998 | Rispoli, Sr. | 359/802 |
| 5,926,315 A | | 7/1999 | McBride | |
| 6,137,639 A | | 10/2000 | Woolwine | |

* cited by examiner

Primary Examiner—Loha Ben

(57) ABSTRACT

Disclosed is a magnifying device mounted on the handle of a shopping cart. The present invention is intended to make it easier for people to read while shopping.

1 Claim, 1 Drawing Sheet

SHOPPING CART MAGNIFIER (E-Z READER)

This application claims priority from provisional application Ser. No. 60/168,645, filed Dec. 3, 1999.

BACKGROUND OF THE INVENTION

Many people find it difficult to read fine print on packaging while shopping—for example, prices, ingredients, instructions, or nutrition information. The ability to read packages easily while shopping is useful for people concerned with drug interactions, allergic reactions, and health conditions related to nutrition. The desired information is often found in the smallest, least-readable print on the package. As people grow older, they are more likely to experience visual impairment, especially near vision and poor vision in dim light. Corrective lenses used in everyday activities often are not adequate to read small print on packages.

One solution for this problem is to have magnifying devices conveniently available while shopping. Additional light would also be useful. In the prior art, U.S. Pat. No. 5,113,289 to Soper, U.S. Pat. No. 5,245,477 to Nyman, U.S. Pat. No. 5,926,315 to McBride, and U.S. Pat. No. 6,137,639 to Woolwine disclose various options for mounting magnifiers on store shelves. At fixed heights and locations, such devices are not necessarily convenient for any particular shopper at any particular time. They also create clutter and obstructions. Furthermore, they are easily overshadowed, which dims light for reading. The present invention mounts a magnifying device on a shopping cart, allowing the shopper to use it conveniently anywhere in a store. Applicants are unaware of any prior art that mounts a magnifier on a shopping cart.

BRIEF SUMMARY OF THE INVENTION

The present invention relates to a magnifying device mounted on the handle of a shopping cart. It includes the following interrelated aspects and features:

A) A means of attachment to a shopping cart handle is intended to grip the cart handle firmly so as to hold the device in a convenient position. In the preferred embodiment, this means of attachment is provided by one or more clamps.

B) A magnifying device is intended to allow the user to enlarge the images of items placed beneath it. In the preferred embodiment, this magnifying device consists of a refractive lens.

C) A supporting structure connects the magnifier with the means of attachment and is intended to hold the magnifier at a convenient angle for the user. In various embodiments, this structure could be made long or short, rigid or flexible, according to the needs of the user. In the embodiment described herein, the structure is short and rigid and consists of one section that connects to the means of attachment and another that frames a space sufficient to hold a magnifying device.

The device disclosed in detail here illustrates one embodiment the present invention. Those skilled in the art will readily discern other ways to embody the present invention. Those skilled in the art will also discern numerous obvious improvements to the invention. These may include providing means of attachment that are adjustable or removable; modifying the configuration of the means of attachment; substituting magnifiers of other kinds including electronic magnifiers, electronic display screens etc.; providing a supporting structure that is flexible; or providing a light to illuminate the field of view.

DETAILED DESCRIPTION

Figure 1:
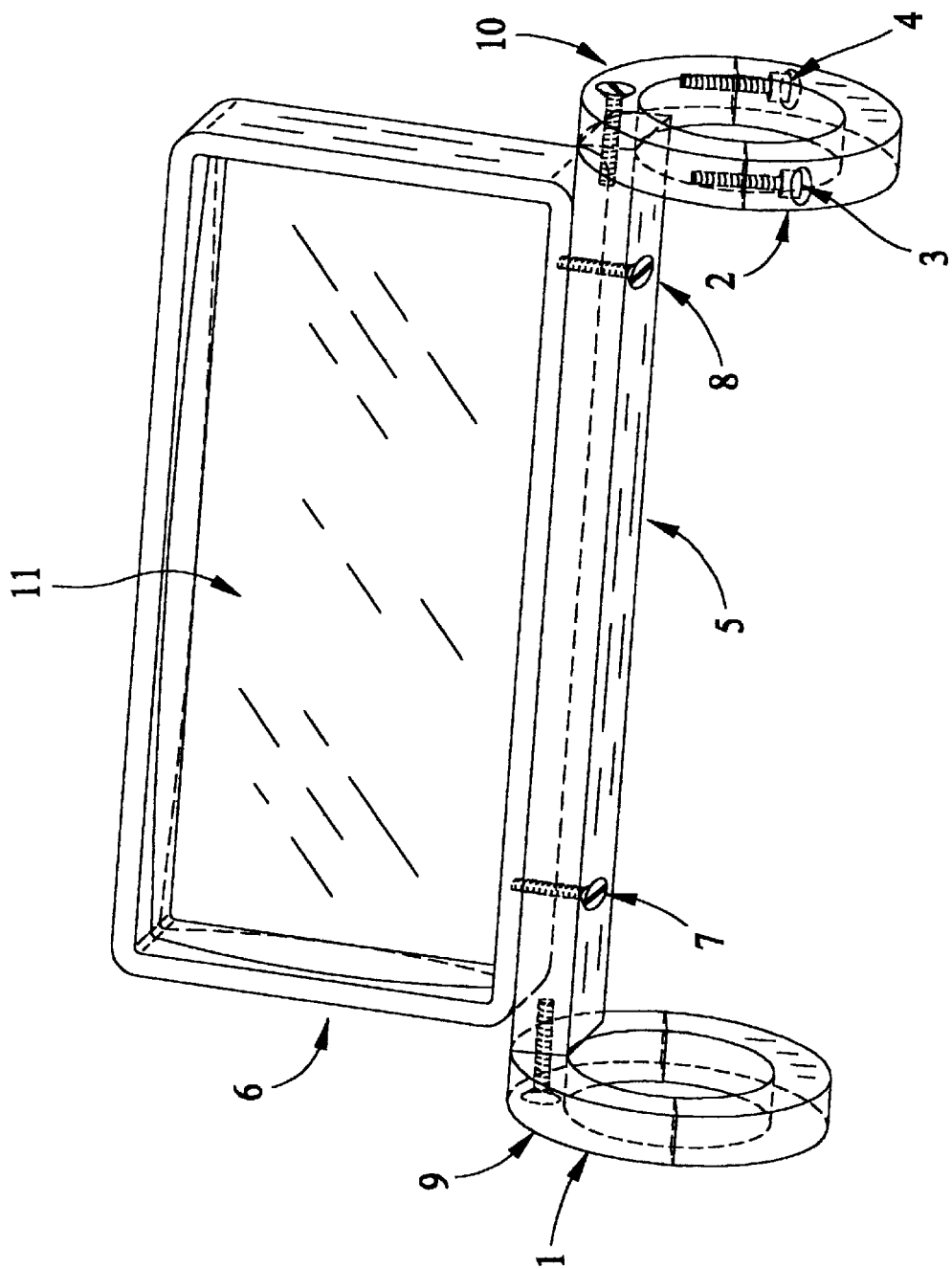
FIG. 1 shows a perspective view of the present invention.

In this particular embodiment, the means of attachment to the shopping cart handle consists of two pairs of semi-circular clamps (1, 2) fastened together with two screws (3, 4) per pair. The supporting structure consists of a rectangular bar (5) and a frame (6) attached to one another by means of two screws (7, 8). Screws (9, 10) attach each of said clamps to the ends of said bar. Said frame holds a magnifying device, which in this embodiment consists of a refractive lens (11).

What is claimed is:

1. A device to mount a magnifying device on a shopping cart handle, comprising:

A. a means of attachment to the handle of a shopping cart;

B. a magnifying device; and

C. a supporting structure connecting said means of attachment to said magnifying device and holding said magnifying device in a convenient position.

\* \* \* \* \*